Figure 3:
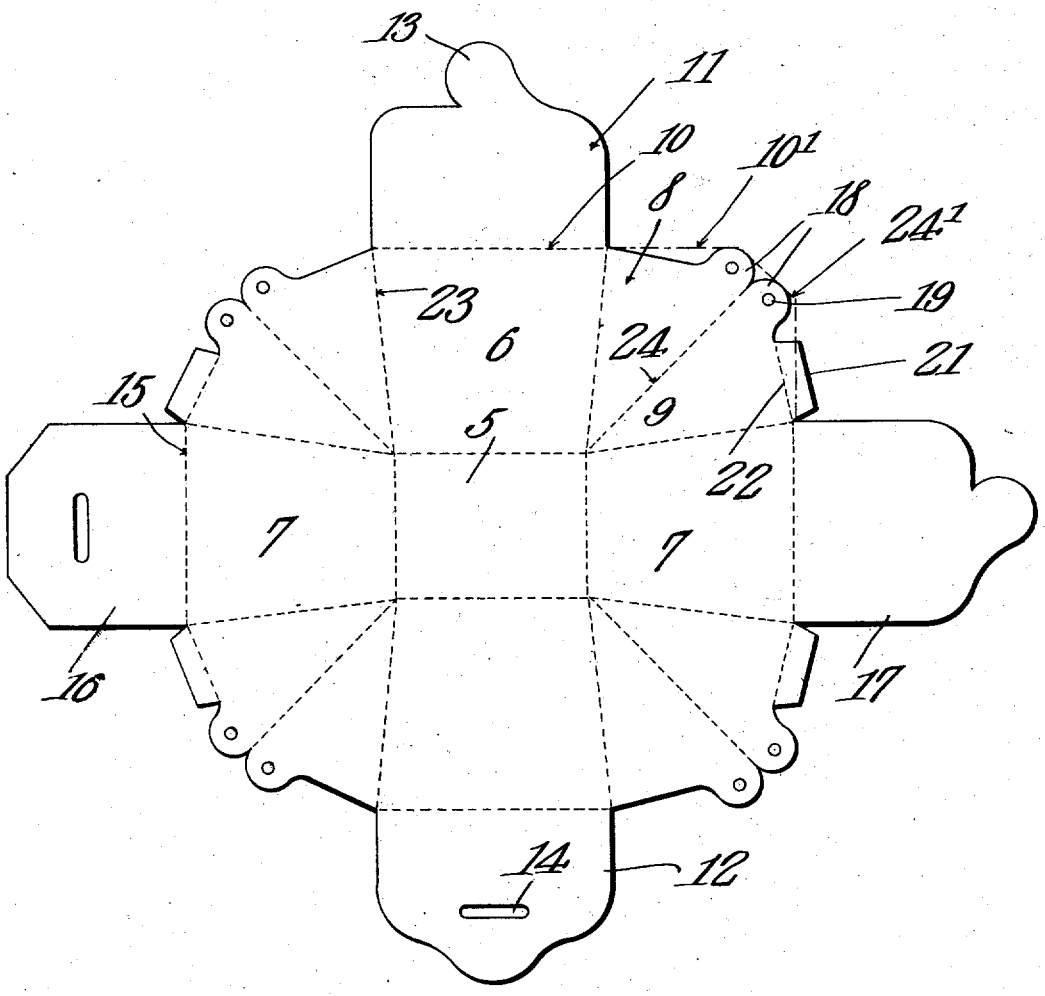

C. T. BLOOMER.
PAPER VESSEL.
APPLICATION FILED MAY 17, 1909.
Reissued Aug. 10, 1909.
13,005.
2 SHEETS—SHEET 1.
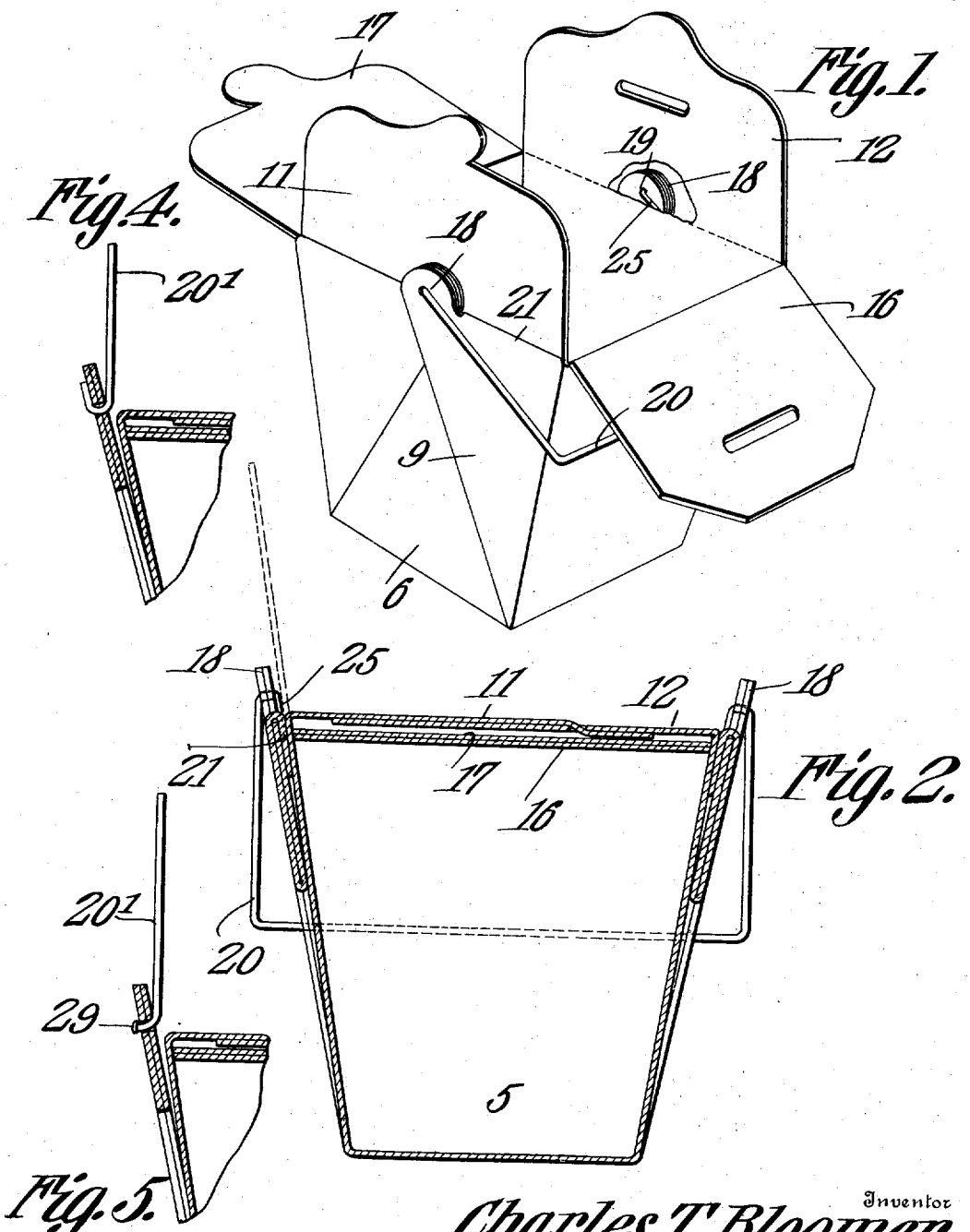
Witnesses
E. J. Clement
F. T. Chapman
Inventor
Charles T. Bloomer.
By C. A. Snow & Co.
Attorneys
ANDREW. B. GRAHAM CO., PHOTO-LITHOGRAPHERS, WASHINGTON, D. C.

C. T. BLOOMER.

PAPER VESSEL.

APPLICATION FILED MAY 17, 1909.

Reissued Aug. 10, 1909.

13,005.

2 SHEETS—SHEET 2.

Inventor

Charles T. Bloomer.

Witnesses

E. F. Clement

F. T. Chapman

By C. A. Snow & Co.

Attorneys

ANDREW, B. GRAHAM CO., PHOTO-LITHOGRAPHERS, WASHINGTON, D. C.

UNITED STATES PATENT OFFICE.

CHARLES T. BLOOMER, OF NEWARK, NEW YORK.

PAPER VESSEL.

No. 13,005. Specification of Reissued Letters Patent. Reissued Aug. 10, 1909.

Original No. 883,855, dated April 7, 1908, Serial No. 374,709. Application for reissue filed May 17, 1909. Serial No. 496,678.

*To all whom it may concern:*

Be it known that I, CHARLES T. BLOOMER, a citizen of the United States, residing at Newark, in the county of Wayne and State of New York, have invented a new and useful Paper Vessel, of which the following is a specification.

This invention relates to paper receptacles and more particularly to that class of receptacles especially designed for carrying oysters and other liquid or semiliquid substances.

The object of the invention is to provide a pail or receptacle the side walls of which are provided with vertically disposed bail supporting ears which extend above the fold lines at the top or cover of the pail thereby to prevent leakage of the contents of said receptacle.

A further object of the invention is to reduce the size of the pail and thus effect a saving in stock without diminishing the carrying capacity of the pail, this result being accomplished by arranging the receiving bail openings above the fold lines of the cover so that the pail may be filled to the cover line.

A further object is to arrange the terminals of the supporting bail in such a manner that when the cover of the pail is moved to open position, said cover will form a housing for the bail supporting ears and terminals of the bail and thus permit a plurality of said pails to be compactly nested without liability of the terminals of the bail of one pail cutting, puncturing or otherwise mutilating the walls of an adjacent pail.

A further object is to form the reinforcing wings of the side walls with locking flaps adapted to be folded downwardly in engagement with said wings thereby to assist in retaining the wings in engagement with the adjacent side walls of the pail.

A still further object of the invention is to generally improve this class of devices so as to increase their utility, durability, and efficiency.

Further objects and advantages will appear in the following description, it being understood that various changes in form, proportions and minor details of the construction may be resorted to within the scope of the appended claims.

In the accompanying drawings forming a part of this specification: Figure 1 is a perspective view of a pail constructed in accordance with my invention, the inner and outer covers of the pail being shown in open position. Fig. 2 is a transverse sectional view with the inner and outer covers of the pail in closed position. Fig. 3 is a plan view of the blank from which the pail is constructed. Fig. 4 is a detail vertical sectional view showing a different manner of supporting the bail. Fig. 5 is a similar view illustrating a further modification.

Similar numerals of reference indicate corresponding parts in all of the figures of the drawings.

The improved pail or receptacle forming the subject matter of the present invention is preferably constructed from a paper or card-board blank of the configuration shown in Fig. 3 of the drawing, and consists of a bottom section 5 having converging side and end walls 6 and 7, there being corner folds 8 and 9 connecting the side walls 6 and the end walls 7 and constituting reinforcing wings when the blank is folded to form the box or receptacle.

The side walls 6 are extended laterally beyond the transverse fold lines 10 to form outer cover sections or flaps 11 and 12 one of which is provided with a locking tongue 13 adapted to engage a corresponding slot or recess 14 formed in the opposite section 12, as shown. The end walls 7 are also projected beyond the adjacent fold lines 15 to form extensions 16 and 17 which constitute the inner cover sections or flaps of the receptacle, said inner cover sections being provided with interlocking parts similar in construction to the interlocking parts of the outer cover sections.

The corner folds or wings 8 and 9 are preferably extended laterally beyond the marginal edge of the blank to form bail supporting ears 18 adapted to register with each other when the blank is folded and are each provided with an opening or aperture 19 adapted to receive the adjacent end of the supporting bail 20.

Attention is here called to the fact that the supporting ears 18 project vertically above the fold lines 15 of the outer cover sections 11 and 12 when the blank is folded so as to effectually prevent the escape of the liquid contents of the receptacle through the bail receiving openings 19.

By arranging the bail supporting ears above the fold line of the cover sections the pail may be filled to the cover leakage point, whereas when the bail openings are formed in the side walls of the pail the latter cannot be filled beyond said bail openings without danger of leakage, thereby effecting a saving in stock without affecting the carrying capacity of the pail.

The corner folds or wings 9 are each provided with a terminal flap 21 adapted to be folded laterally and downwardly on the line 22 into engagement with the inner face of the adjacent wing 8 so as to lock said wings in engagement with each other and thus permit the same to be readily fastened to the adjacent side walls of the receptacle.

In assembling the pail the side walls 6 are folded inwardly on the lines 23 and the corner folds or wings 8 folded on the lines 24 and thence folded laterally on the side walls or panels 6 so as to form a receptacle similar to that shown in Fig. 1 of the drawing, the terminals 25 of the supporting bail being subsequently passed through the apertures 19 in the ears 18, as will be readily understood.

The oysters are then introduced into the receptacle and the inner cover sections 16 and 17 folded downwardly on the lines 10 with the tongue 13 engaging the recess 14 after which the outer cover sections 11 and 12 are folded downwardly upon the inner cover sections and the free ends of the outer cover sections locked in engagement with each other, as best shown in Fig. 2 of the drawings.

After the side walls of the blank are folded into shape and prior to fastening the cover, the locking flaps 21 of the corner folds or wings 9 are folded laterally and downwardly in engagement with the corner folds or wings 8, the wings 8 being subsequently pasted, glued, stapled or otherwise rigidly secured to the adjacent side walls 6 of the receptacle so as to firmly secure the box in set up or assembled position.

Attention is here called to the fact that by folding the locking flaps 21 downwardly in engagement with the wings 8 said wings are effectually combined so as to permit the same to be readily and permanently attached to the side walls of the receptacle. It will also be observed that by extending the ears 18 vertically above the fold lines of the cover of the receptacle the liquid is effectually prevented from leaking through the apertures 19 while by reason of the location of the terminals of the bail, when the outer cover sections 11 and 12 are moved to open position they form housings for the ears and terminals of the bail so as to permit several of said pails to be compactly nested without the liability of the pointed terminal of one bail cutting, piercing or otherwise mutilating the walls of an adjacent pail.

In Fig. 4 there is illustrated a modified form of supporting bail in which the terminal hook of the bail 20′ projects outwardly instead of inwardly, while in Fig. 5 the free end of the bail is provided with a terminal head or knob 29 to assist in preventing accidental displacement of said bail.

It will of course be understood that the boxes may be made in different sizes and shapes and formed of paper or other material capable of being bent into the desired shape.

It will also be understood that the corner wings may be folded laterally in engagement with either the side or end walls of the pail and that said wings may be pasted, stapled or otherwise fastened.

From the foregoing description it is thought that the construction and operation of the device will be readily understood by those skilled in the art and further description thereof is deemed unnecessary.

Having thus described the invention what is claimed is:—

1. A paper receptacle provided with a cover and having its side walls formed with reinforcing wings the ends of which are extended above the fold lines of the cover and over-lapped to form bail supporting ears having perforations formed therein and adapted to register with each other, a bail pivotally mounted in said perforations, and locking flaps formed integral with the wings and disposed on opposite sides of each bail supporting ear and adapted to be folded downwardly between said wings and the adjacent side walls of the receptacle.

2. A paper receptacle having main and auxiliary covers and having its side walls provided with reinforcing wings the upper ends of which are extended vertically above the fold lines of the cover and over-lapped to form pivoted bail supporting ears, and locking flaps formed integral with the wings and disposed one on each side of the ears, said flaps being foldable downwardly between said wings and the adjacent side walls of the receptacle.

3. A paper receptacle provided with a cover having its side walls reinforced by a plurality of pairs of reinforcing wings, the free ends of which are extended vertically above the cover to form perforated bail supporting ears, a locking flap formed on one of the wings of each pair at the adjacent bail supporting ear and adapted to be folded laterally and downwardly over the adjacent wing of said pair, and a bail having its opposite ends extended through the perforations in the ears, said cover forming a housing for the ears and adjacent ends of the supporting bail when said cover is moved to open position.

4. A blank for paper fasteners comprising a body portion provided with a plurality of fold lines defining a bottom section and radiating side and end sections, there being diagonally disposed fold lines disposed between the side and end sections of the blank and defining corner folds or wings some of which are provided with extensions constituting locking flaps, and perforated tabs extending laterally from the wings on each side of the diagonal fold lines of the blank and adapted to register with each other when the blank is folded to form bail supporting ears.

5. A paper receptacle provided with a cover having its side walls reinforced by a plurality of pairs of reinforcing wings with the free ends extended above the cover and perforated to form ears, and a bail having its opposite ends extended through the perforations in the ears, the said cover, when open, constituting a shield protecting the walls of another like receptacle in nested relation to the first receptacle from engagement with the said bail ends.

6. A paper receptacle having a cover and perforated ears exterior to and extending above the cover, and a bail having its ends extending through the perforations in the ears, said cover constituting, when open, a shield for the ends of the bail protecting the walls of another like receptacle in nested relation to the first receptacle from engagement with said bail ends.

In testimony that I claim the foregoing as my own, I have hereto affixed my signature in the presence of two witnesses.

CHARLES T. BLOOMER.

Witnesses:

ERNEST F. FOX,

S. F. SHERMAN.